(12) United States Patent
Andersen

(10) Patent No.: US 6,766,226 B2
(45) Date of Patent: Jul. 20, 2004

(54) METHOD OF MONITORING UTILITY LINES WITH AIRCRAFT

(75) Inventor: Dan Keith Andersen, Red Deer (CA)

(73) Assignee: Andersen Aeronautical Technologies, Ltd., Red Deer (CA)

( * ) Notice: Subject to any disclaimer, the term of this patent is extended or adjusted under 35 U.S.C. 154(b) by 0 days.

(21) Appl. No.: 10/176,706

(22) Filed: Jun. 19, 2002

(65) Prior Publication Data
US 2003/0236597 A1 Dec. 25, 2003

(30) Foreign Application Priority Data
May 16, 2002 (CA) .............................. 2386651

(51) Int. Cl.⁷ .............................................. G06F 19/00
(52) U.S. Cl. ........................... 701/3; 382/100; 348/144
(58) Field of Search ............................. 701/3; 348/142, 348/144, 145, 146, 147; 702/134, 135, 136, 182, 183; 382/100, 103

(56) References Cited

U.S. PATENT DOCUMENTS

| | | | | |
|---|---|---|---|---|
| 4,904,996 A | * | 2/1990 | Fernandes | 340/870.07 |
| 5,045,937 A | * | 9/1991 | Myrick | 348/144 |
| 5,166,789 A | * | 11/1992 | Myrick | 348/144 |
| 5,818,951 A | * | 10/1998 | Schivley | 382/100 |
| 5,878,356 A | | 3/1999 | Garrot, Jr. et al. | |
| 6,118,885 A | * | 9/2000 | Wadsworth et al. | 382/100 |
| 6,243,483 B1 | * | 6/2001 | Petrou et al. | 382/103 |
| 2003/0075642 A1 | * | 4/2003 | Silansky et al. | 244/30 |

OTHER PUBLICATIONS

Curtis, Inc. product brochure, Nitro! Xe, 2 pages.
Curtis, Inc. product brochure, Nitro–eSCAN, 2 pages.
Curtis, Inc. company profile, 2 pages.
Wescam 12DS200 product brochure, 2 pages.

* cited by examiner

Primary Examiner—Gary Chin
(74) Attorney, Agent, or Firm—Christensen O'Connor Johnson Kindness PLLC

(57) ABSTRACT

A method of monitoring utility lines with an aircraft. A first step involves equipping the aircraft with at least one dual sensor camera capable of concurrently capturing both thermal images and real time video images. A second step involves equipping the aircraft with at least one of a storage medium adapted to store the thermal images and the video images or a display medium capable of concurrently displaying the thermal images and the video images. A third step involves flying along a utility right of way concurrently capturing the thermal images and the video images with the dual sensor camera. A fourth step involves reviewing the thermal images for thermal anomalies and the video images for visual anomalies.

7 Claims, 3 Drawing Sheets

METHOD OF MONITORING UTILITY LINES WITH AIRCRAFT

FIELD OF THE INVENTION

The present invention relates to a method of monitoring utility lines with aircraft.

BACKGROUND OF THE INVENTION

Aircraft are used to monitor utility lines, such as pipelines and power lines. They use thermal imaging to detect anomalies. Thermal imaging is capable of showing heat loss or gain through transmission. However, extensive use of thermal imaging has shown that it has short comings. For example, thermal imaging would not disclose a small sub-surface pipeline leak, which has not yet worked its way to surface. There has been growing frustration that problems continue to occur undetected, notwithstanding extensive programs of monitoring through thermal imaging.

SUMMARY OF THE INVENTION

What is required is a better method of monitoring utility lines.

According to the present invention there is provided a method of monitoring utility lines with an aircraft. A first step involves equipping the aircraft with at least one dual sensor camera capable of concurrently capturing both thermal images and real time video images. A second step involves equipping the aircraft with at least one of a storage medium adapted to store the thermal images and the video images or a display medium capable of concurrently displaying the thermal images and the video images. A third step involves flying along a utility right of way concurrently capturing the thermal images and the video images with the dual sensor camera. A fourth step involves reviewing the thermal images for thermal anomalies and the video images for visual anomalies.

The use of a dual sensor camera is based upon the belief that visual anomalies may appear before any heat loss or gain is apparent that would be detectable through thermal imaging. For example, a subsurface pipeline leak may cause a discoloration of vegetation or may affect the density or type of vegetation. Similarly, discoloration may become apparent in standing or moving waterways. With the present method, one skilled in monitoring such phenomenon may concurrently view the thermal image and the visual image to examine for any anomalies that warrant further investigation.

Although beneficial results may be obtained through the use of the method, as described above, even more beneficial results may be obtained when the aircraft is equipped with a supplementary sensor. The supplementary sensor provides a further cross check, which can provide more information to assist in determining whether further investigation is warranted. The type of supplementary sensor used will depend upon the nature of the utility line being monitored. For example, for an oil pipeline an appropriate supplementary sensor might be a hydrocarbon analyser.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The preferred method for monitoring utility lines with aircraft, will now be described with reference to FIGS. 1 through 3.

Figure 1:
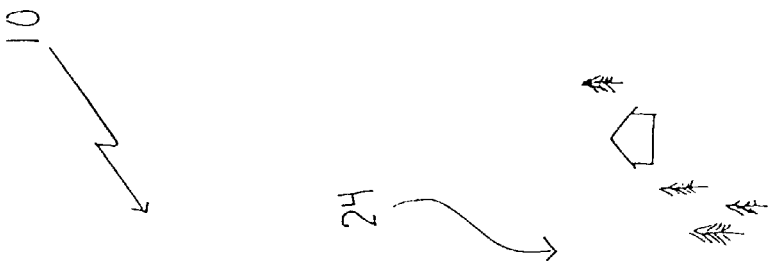
FIG. 1 is a perspective view of an aircraft monitoring a utility line in accordance with the teachings of the present invention.
Figure 1:
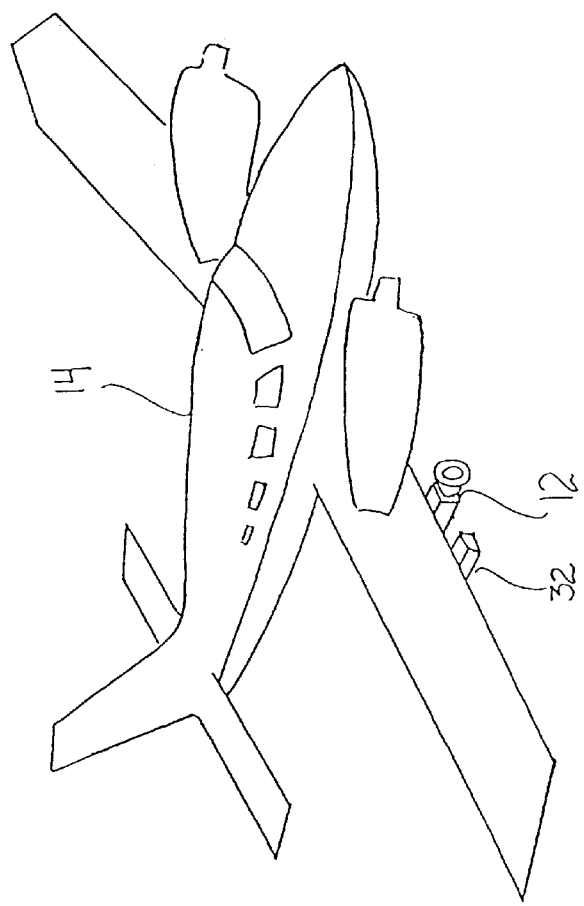

Referring to FIG. 1, there is provided a method of monitoring utility lines 10. To do so, a dual sensor camera 12 that is capable of concurrently capturing both a thermal image and a real time video image, is mounted on an aircraft 14.

Figure 2:
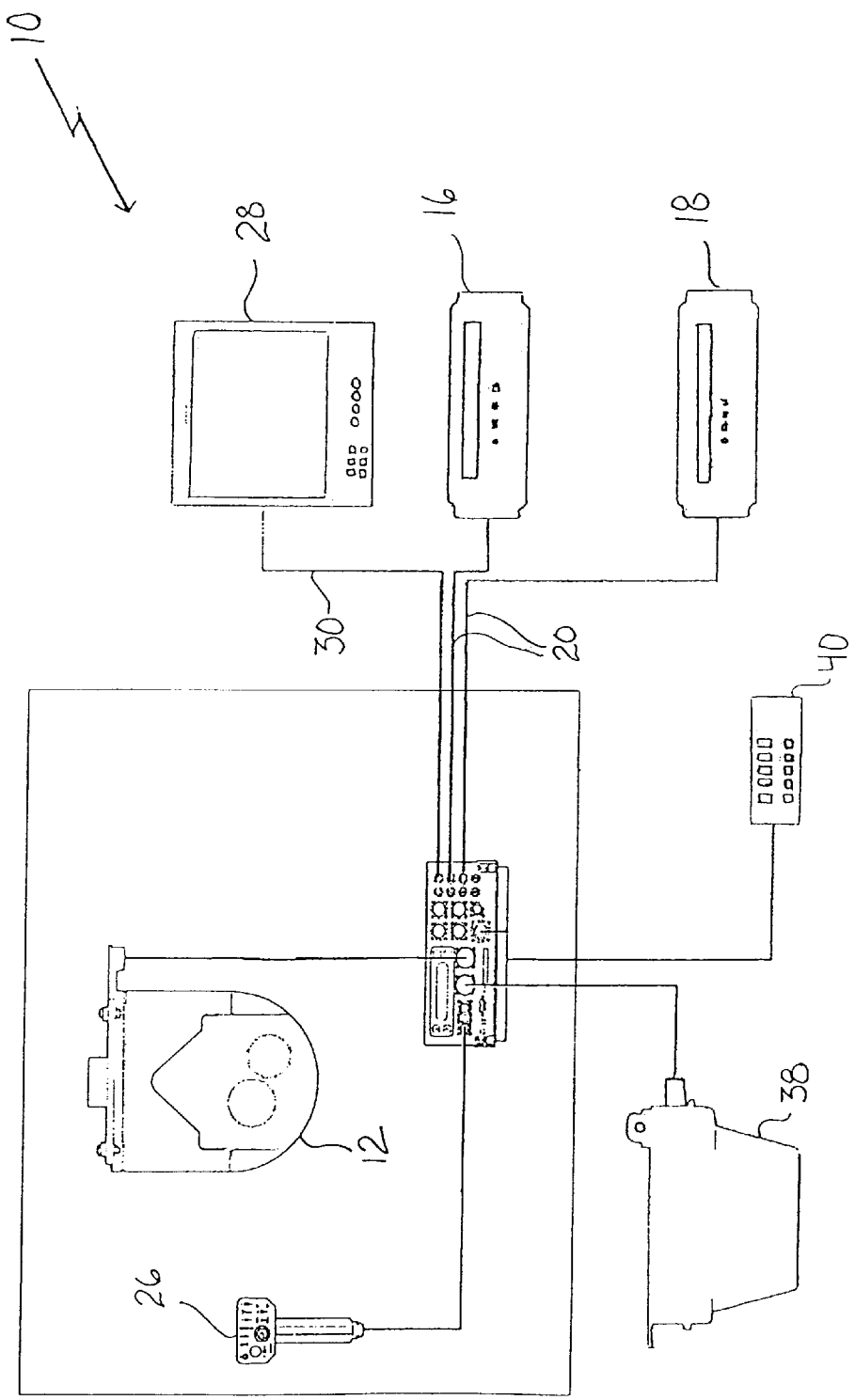
FIG. 2 is a first schematic view of equipment configured in accordance with the teachings of the present method.

Referring to FIG. 2, in the illustrated embodiment, a first video tape recorder 16 for recording thermal images and a second video tape recorder 18 for recording real time video images are provided. First video tape recorder 16 and second video tape recorder 18 are mounted within aircraft 14 illustrated in FIG. 1 and receive data from dual sensor camera 12 via input cables 20.

Referring to FIG. 1, aircraft 14 is flown along a utility right of way, generally referenced by numeral 24, concurrently capturing the thermal image and the video image. Referring to FIG. 2, the thermal and video images are communicated via input cables 20 to first video tape recorder 16 and second video tape recorder 18. The functions of dual sensor camera 12 can be controlled through hand controller 26. Other types of known recording medium suited for the aviation industry, such as digital records, can also be used to store the thermal images and the video images for subsequent viewing. In addition, the Applicant has concurrently filed a patent for a new configuration data storage configuration using solid state technology.

Referring to FIG. 2, a monitor 28 is provided through which the thermal image and the video image can be concurrently displayed. Monitor 28 receives images via cable 30. In the illustrated embodiment, monitor 28 is capable of picture within picture viewing. Monitor 28 can be used to concurrently review the thermal image for thermal anomalies and the video image for visual anomalies.

Referring to FIG. 1, a supplementary sensor such as a hydrocarbon analyser 32 can also be mounted to aircraft 14. It is envisaged that the "picture in a picture" feature will be used to display the various outputs on a single monitor, with the hydrocarbon analyzer providing a numeric output which is concurrently displayed. However, referring to FIG. 3, a second monitor 34 could be positioned side by side to first monitor 28 in order to concurrently display additional images, such as a graphic output image created from data provided by hydrocarbon analyser 32. If the viewing of the thermal images and the video images is being done while the aircraft is in flight, it may be desirable to also include an audible alarm. The audible alarm will draw to the attention of the crew that closer scrutiny is warranted.

Figure 3:
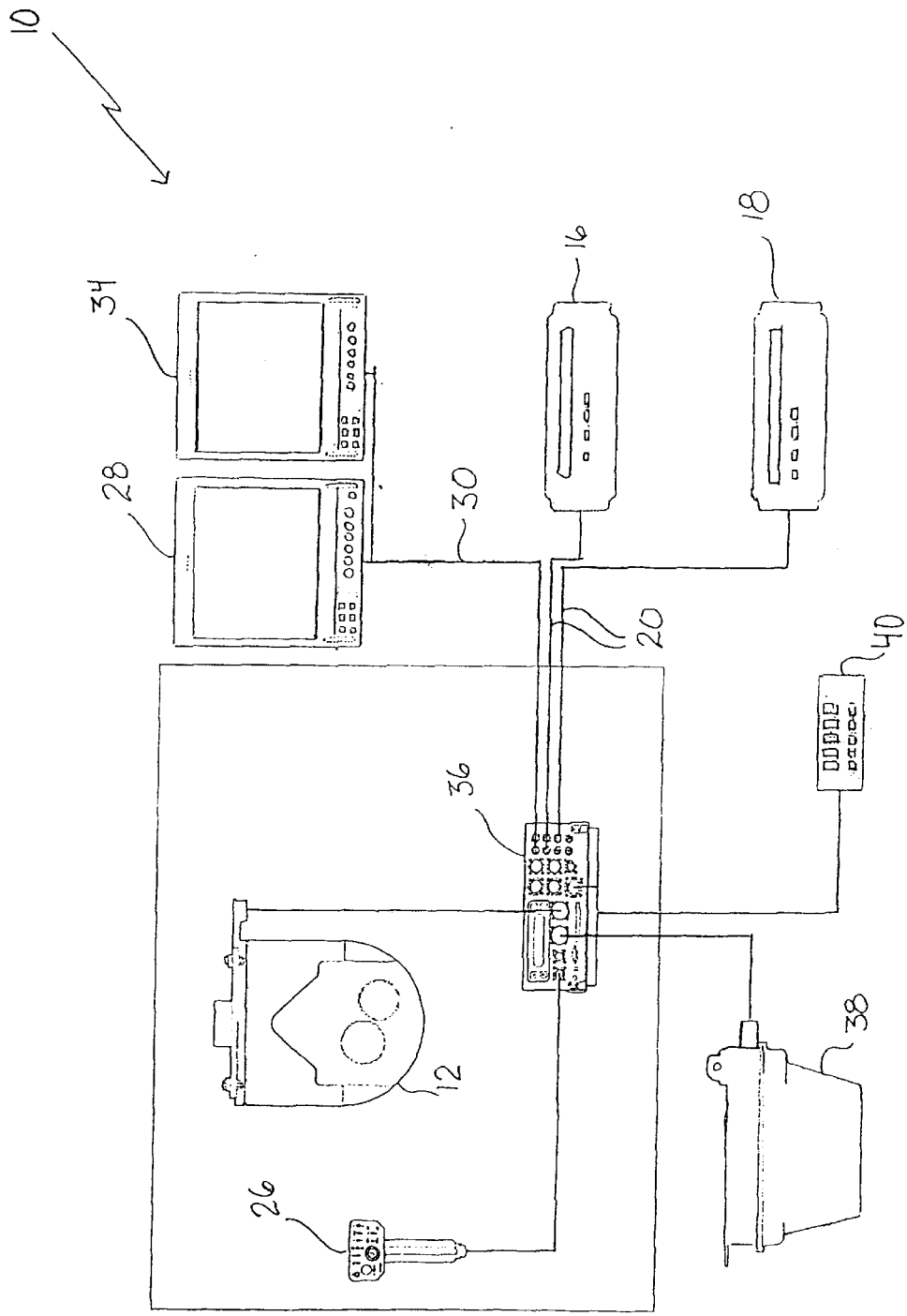
FIG. 3 is a second schematic view of equipment configured in accordance with the teachings of the present method.

Referring to FIGS. 2 and 3, it is envisaged that an on board interface unit 36 will be provided through which the various components of the system are controlled. In addition, all data can be sent by to ground based personnel via a microwave transmitter 38. In the event that an unmanned remotely controlled aircraft 14 is used, a ground based control panel 40 can take over operation of the various components of the system, such as control over the positioning and focusing of dual sensor camera 12 via duplicate over-riding controls.

The example used to demonstrate the utility of the present invention has been a pipeline which has a subsurface leak. It will be apparent skilled in the art that using the teachings of the present invention, one can also monitor other utilities, such as power lines and associated equipment.

Cautionary Notes:

Several flights were flown by helicopter over various pipelines using cameras with different resolution. In an inaugural flight for a pipeline company that painted their pipeline with red and black paint, anomalies were detected immediately with all cameras regardless of resolution. However, problems were encountered with some of the cameras with pipelines which were painted a light color. This is a matter of major importance in view of the fact that most pipelines are painted or coated with a light colored coating such as white, yellow or silver. After further investigation it was determined that an infrared camera with a resolution of less than 256×256 pixels was incapable of detecting anomalies along a light colored pipeline that reflected light on a warm day with the temperatures approaching or above 20 degrees celcius. It is, therefore, strongly recommended that a camera be used that has a resolution of 256×256 pixels or greater. Expressed another way, it is preferred that a camera is used that has not less than 256×256 pixels.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

What is claimed is:

1. A method of monitoring utility lines with an aircraft, comprising the steps of:

equipping the aircraft with one dual sensor camera capable of concurrently capturing both thermal images and real time video images and having a resolution of at least 256×256 pixels;

equipping the aircraft with at least one of a storage medium adapted to store the thermal images and the video images or a display medium capable of concurrently displaying the thermal images and the video images;

flying along a utility right of way concurrently capturing the thermal images and the video images with the dual sensor camera; and reviewing the thermal images for thermal anomalies of loss or gain and the video images for visual anomalies.

2. The method of monitoring utility lines as defined in claim 1, the reviewing step involving concurrently viewing the thermal images and the video images on the display medium while the aircraft is in flight.

3. The method of monitoring utility lines as defined in claim 1, the reviewing step involving recording the thermal images and the video images to the storage medium during flight and concurrently viewing the thermal images and the video image subsequent to the aircraft being in flight.

4. The method of monitoring utility lines as defined in claim 1, including the further step of equipping the aircraft with a supplementary sensor which provides a supplemental warning of the existence of anomalies.

5. The method of monitoring utility lines as defined in claim 4, the supplemental warning being in the form of an audible alarm.

6. The method of monitoring utility lines as defined in claim 4, the supplemental warning being concurrently displayed as one of a numeric or a graphic output image created from data provided by the supplementary sensor.

7. The method of monitoring utility lines as defined in claim 4, the supplementary sensor being a hydrocarbon analyser.

* * * * *